(12) United States Patent
Tansingco

(10) Patent No.: US 11,358,540 B2
(45) Date of Patent: Jun. 14, 2022

(54) PROTECTIVE SHELL FOR PASSENGER VEHICLE DOOR

(71) Applicant: Edward Tansingco, Santa Ana, CA (US)

(72) Inventor: Edward Tansingco, Santa Ana, CA (US)

( * ) Notice: Subject to any disclaimer, the term of this patent is extended or adjusted under 35 U.S.C. 154(b) by 171 days.

(21) Appl. No.: 16/914,649

(22) Filed: Jun. 29, 2020

(65) Prior Publication Data

US 2021/0402934 A1    Dec. 30, 2021

(51) Int. Cl.
*B60R 13/02* (2006.01)

(52) U.S. Cl.
CPC ...... *B60R 13/0243* (2013.01); *B60R 13/0206* (2013.01)

(58) Field of Classification Search
CPC ........ B60J 11/06; B60J 5/0418; B60J 5/0493; B60R 13/0206; B60R 13/0243
See application file for complete search history.

(56) References Cited

U.S. PATENT DOCUMENTS

| 2,600,296 A * | 6/1952 | Jacobs | B60J 10/75 |
| | | | 49/377 |
| 3,855,898 A | 12/1974 | McDonald | |
| 6,926,341 B1 | 8/2005 | Addesso et al. | |
| 8,615,932 B2 * | 12/2013 | Setina | B60J 11/06 |
| | | | 296/146.7 |
| 2006/0261633 A1 | 11/2006 | Winborn | |
| 2009/0151827 A1 | 6/2009 | Thompson | |
| 2013/0055643 A1 | 3/2013 | Setina | |
| 2014/0054914 A1 * | 2/2014 | Teoh | B32B 3/06 |
| | | | 296/1.08 |
| 2015/0097392 A1 | 4/2015 | Locke | |

* cited by examiner

*Primary Examiner* — D Glenn Dayoan
*Assistant Examiner* — Melissa Ann Bonifazi
(74) *Attorney, Agent, or Firm* — Laubscher & Laubscher, P.C.

(57) ABSTRACT

A protective shell protects an interior door panel of a vehicle having an inner face with a protruding door pull defining a door well for receiving a user's fingers and a door sill leading to a window opening. The protective shell has a deformable sheet of hard plastic with an exposed side and a reverse side, the reverse side being profiled to fit over the inner face of the vehicle door interior panel. An outwardly directed top surface portion rests on the door sill. A protrusion on the exposed side of the deformable sheet encloses the vehicle door pull. A locking well extends downwardly from an upper ledge of the door pull and is responsive to downward pressure on the upper ledge to fit snugly into the door well to hold the protective shell securely in position on the interior door panel.

20 Claims, 7 Drawing Sheets

PROTECTIVE SHELL FOR PASSENGER VEHICLE DOOR

FIELD OF THE INVENTION

This invention relates to the field of vehicle accessories, and more particularly to a protective shell for protecting the door panel of a passenger vehicle, and a method of applying the protective shell.

BACKGROUND OF THE INVENTION

The average price of new cars has been trending upward and most car manufacturers have been providing new models with more plush interiors in response to consumer demand. Most passenger cars sold today have interiors lined with easily damaged surfaces made of highly finished plastic, painted plastic, cloth, vinyl, leather, skinned-foam, finely finished wood trim and other soft upholstery materials serving primarily cosmetic, non-structural purposes. The interior door panels are designed primarily to be aesthetically pleasing and may serve to provide places to mount door handles, lock buttons, window controls, door pulls, arm rests, cup holders, speakers and small storage compartments. There are many day to day situations during which a car's interior panels are exposed to cosmetic damage by its occupants or from contact with other items that are temporarily placed on the seat of the vehicle. Items which are regularly loaded onto car seats such as child car seats, sporting equipment, groceries such as canned goods and glass bottles, paper or plastic boxes, tools, small pieces of furniture, luggage or other equipment can jostle around during loading or transport and cause scuffs, scrapes and tears on the panel. Other potential causes of damage to interior panels come from the occupants themselves who can easily spill liquids onto the panels, abrade the plastic and upholstery with worn jewelry. Another potential cause of damage is from contact with pet claws, teeth and saliva when owners travel with their dogs who often try to look out the window while placing their paws on the arm rest and sill.

Damaged panels are very costly to repair or replace, diminish the enjoyment of the owner who paid such a high price for their car, and ultimately reduce the resale value of the vehicle. Interior door protectors are described in prior art but their installation is elaborate, requiring fasteners such as screws or adhesives to hold them in the intended operating position which consequently puncture or mar the interior surfaces hence diminishing the purpose of protecting the vehicle to maintain its original condition. Some interior door protectors are made of flexible materials such as cloth have been known to be blown out the window when the car is traveling at normal highway speeds thus requiring them to be held down by hook and loop strips (like Velcro) of which one side of the fastener must be affixed to the interior surface with adhesive where it cannot be tied down to some other feature of the vehicle interior. Further, they are not convenient to install or remove so that frequent removal and installation is not possible.

Therefore, a car door panel protector which will protect the panel from day to day hazards, and will itself cause no damage during its installation and use, and which is easily removable without adhesives or fasteners, can preserve the appearance and value of the vehicle is needed.

Many car owners take pride in their vehicles and want to protect their investment but, like most people, are also extremely busy and so would probably prefer to have a car door panel protector that they can install and remove quickly and easily such as when they are cleaning the interior of the car.

U.S. Pat. No. 6,926,341 to Addesso discloses a pad which is secured to the door panel with a flap to which hang tabs are secured and inserted in the well between the interior portion of the car door and the window. The hang tabs in Addesso's apparatus are inserted in between the well and window glass, making contact with the window glass and therefore tend come out when the window is rolled up. Further, the tabs which are in contact with the glass tend to cause scratches to any tint that is applied to the glass. Due to their placement, the tabs also make contact with and cause indentations in the inner door window beltline seal which is normally affixed by the original vehicle manufacturer on the return face of the panel. This window seal is usually flocked with fine fibers where it is intended to make contact only with the window glass to keep outside air from entering the cabin and acts as a brush when the window is rolled up and down is very sensitive to damage from contact with other surfaces than the window.

U.S. Pat. No. 8,615,932 to Setina discloses a barrier element for protecting an interior vehicle door panel which is comprised of a body shaped to fit over the vehicle door interior panel. The panel of Setina which is intended to be installed in law enforcement vehicles, is made from a rigid plastic sheet, such as 0.187 thermoplastic olefin (TPO), is very sturdy and will presumably provide ample protection for a car's interior door panel against the actions of a detainee within the vehicle and therefore will not be pliable. Any recesses are stated to be covered by a plane or convex surface to prevent concealment of contraband. It also requires that the panel be mounted to the door using screws or adhesive which will certainly reduce the resale value of the vehicle and will not easily allow the average consumer to frequently remove and install the apparatus.

U.S. Pat. No. 3,855,898 to W McDonald discloses a series of transparent protective panels made of tough, bullet resistant plastics for windshields and windows of a vehicle and means for attaching them to a vehicle. It describes fabric straps or metal clips secured to the panels which engage with window trim means of a vehicle. FIG. 4A shows a foot attaching clip or bracket 72 and a second positioning clip or strap 73 both secured to a panel 70 by means 74. This clip and the second positioning clip 73 are separate components attached with fasteners 74 to the panel 70, are not formed unitary with the protective panel thereby increasing the cost of manufacturing. Further, the assembly of FIG. 4A will not allow unobstructed use of the door.

SUMMARY OF THE INVENTION

The invention provides a protective shell for protecting a passenger car interior door panel to preserve the value and enjoyment of the vehicle comprises a thin hard plastic shell shaped to fit over the vehicle door interior panel. The protective element will allow use of the door and widow as provided by the original equipment manufacturer. The protective element is removably securable to the vehicle door panel without fasteners or adhesives by interfacing with the door pull and the interior surface of the panel such that the protective element can be easily installed and removed to expose or cover up the original panel on a frequent basis.

In accordance with a first aspect of the invention there is provided a protective shell for protecting an interior door panel of a vehicle, the interior door panel having an inner face with a protruding door pull defining a door well for receiving a user's fingers and a door sill leading to a window opening, the protective shell comprising a deformable sheet of hard plastic with an exposed side and a reverse side, the reverse side being profiled to fit over the inner face of the vehicle door interior panel; an outwardly directed top surface portion for resting on the door sill; a protrusion on the exposed side of the deformable sheet for enclosing the vehicle door pull, the protrusion having an upper ledge; and a locking well extending downwardly from the upper ledge and responsive to downward pressure to fit snugly into the door well to hold the protective shell securely in position on the interior door panel.

In accordance with embodiments of the present invention installation of the portable car door protective shell requires no fasteners or adhesives.

A passenger car door typically has an interior panel with a horizontally planar sill which has a short, downward return at its top extremity to the outer surface of which is affixed a flexible rubber seal, known as an inner door beltline window seal, running horizontally across the width of the portion of the window which slides up and down. The purpose of this seal is to keep outside air from entering the cabin and is lined with a flocked material where it meets the inside surface of the window to reduce friction when operating the window. The profile of the inner door beltline window seal typically forms an upward oriented V-shaped which provides on one leg of the V, a surface for mounting to the interior panel and the other leg a surface for applying the flocking which meets the window, and serves as a channel to catch liquids or debris from falling into the door cavity. The profile of a beltline window seal may have a plurality of such V shapes.

In the general center of a car interior door panel is typically located a rigid door pull having a well on its top side which provides a hand hold for a passenger to insert their fingers to pull the door shut.

The protective shell may be vacuum formed from plastic of sufficient gauge and rigidity to maintain its shape but which is also sufficiently deformable such that it can smoothly surpass interferences between itself and the vehicle during its installation without causing damage to the vehicle surfaces. A major portion of the shell matches closely to the surface of the interior car panel and therefore is made for a specific model of vehicle. When installed on the vehicle, the protective shell covers the majority of the interior panel including the window sill, the door pull which is sometimes integrated into the arm rest, and the upper plane of the panel where most of the soft or highly finished surfaces of the door are located. The protective shell is cut out at the striker location so as not to interfere with the operation of the door closing. It can be optionally cut out to expose desired features such as the door opening handle, window buttons, door lock buttons, speakers and cup holders.

The protective shell, following the shape of the car interior panel, may be generally planar, have a molded feature which protrudes toward the interior of the vehicle to cover the door pull and may include an integrally molded downward flange at its top edge for inserting into the V channel of the beltline interior window seal. The molded flange which extends the length of the V channel is sufficiently thin to insert into the V channel of the seal without impeding its sealing function. The protruding feature on the protective shell has a well on its top surface whose width follows the width of the well on the door pull to lock the shell into its service position. This locking well in the protective shell, working together with its major surface, which is generally planar and follows the contours of the door panel, serves to adequately lock the protector onto the door panel when it is installed in its service position while the return flange at its top edge serves to further secure it to the door panel. The well of the protective shell has a generous fillet where its walls meet its bottom surface to allow the shell to glide smoothly across the interior precipice of the door pull well during installation until it snaps into its service position. The locking well of the protective shell also provides the ability of the occupant to use it as a door pull.

In many vehicles, the door pull generally has a bottom surface which is approx. 3" to 5" below its top surface. If the shell were to perfectly match the contour of the door pull, it would create an interference which would prevent the insertion of the well of the protective shell into the door pull well. In order to overcome this obstruction, the bottom surface of the shell's door pull protrusion is offset downward from its corresponding door pull surface by a distance which at least is equal to the depth of the locking well on its top surface to provide adequate clearance to fit the protrusion over the door pull. This offset creates a cavity underneath the door pull when the shell is fully installed.

The protective shell is installed by initially setting it onto the door pull such that the bottom surface of its locking well sits on top of the door pull. Then, with light finger pressure applied downward and towards the door onto the upper edge of the shell's protrusion, the reverse side surfaces of the protective shell will glide smoothly across the panel at the precipice of the door pull well and across other slightly interfering points along the surface of the door until it snaps into position. Hence, the protective shell must be hard enough to be self-supporting but sufficiently pliable and resilient in order to facilitate its smooth installation and also to prevent damage to the delicate surfaces of the interior door panel during installation.

Since almost all of the potential causes of damage will have either a downward or sideward trajectory, the protective shell remains securely in its service position to resist forces from these directions until it is ready to be removed.

To unlock the protective shell, applying light finger pressure upward against the bottom surface of the door pull protrusion of the protective shell will unlock the locking well from the door pull which releases the shell.

A suitable protective shell can be manufactured by vacuum forming a plastic sheet of impermeable plastic such as PET (polyethylene terephthalate) which is of sufficient thickness (approx. 0.060") to maintain its shape but appropriately pliable such that it can smoothly surpass minor interferences between itself and points on door panel when it is snapped into its service position on the interior door panel using only light finger force, yet sufficiently hard that it is resistant to abrasion and impact during use. The shell will spring back to its original shape once it surpasses the interference points keeping a snug fit against the door. The inner surface of the shell is smooth to prevent abrasion during installation and use. PET plastic is the most widely produced plastic in the world today and has many applications including its more recent use in the manufacture of hard sided luggage, examples of which are exposed to abrasion and impact from other objects during handling. Other materials that may be used to create the protective shell are Polycarbonate, ABS (acylolnitrile butadine styrene) or HIPS (high impact poly styrene).

The flange of the protective shell located at the top end of the window sill needs to be sufficiently thin in order to fit inside the V channel of the window seal such that it does not impede its sealing purposes. Simultaneously, the remainder of the shell must be sufficiently thick to provide adequate protection for the door from damage. The vacuum forming process, which involves heating a parison sheet of thermoplastic until it is malleable, drawing it down onto a mold by manipulating relative air pressure, and allowing it to cool in its new shape until it is stiff, is well suited for the creation of plastic parts with thin profiles relative to their overall size. It is therefore ideal for forming the protective shell of the present invention since one characteristic of vacuum forming is that the parison sheet stretches as it is drawn down and more so where it is adjacent to a vertical wall becoming progressively thinner as it is drawn toward the bottom of the wall. Since the protective shell is vacuum formed laying flat on its reverse face, the flange will become the thinnest portion of the shell while its major planar surface, its smooth transition into the sill, and the protrusion that covers the door pull will be first to make contact with the parison, cooling it in these areas, and therefore locally stopping it from stretching further. The vacuum forming process allows the protective shell, inclusive of its components, to be formed as a single integral piece since it naturally forms the shell thicker in the areas that will be exposed to more abrasion and impact while forming the flange to be sufficiently thin. Forming the protective shell as a single piece simplifies the construction of the protective shell thereby lowering its cost to manufacture and enhancing its structural integrity.

In some cases, undercut features such as the locking well described in the present invention may be difficult for certain vacuum form manufacturers to form. An alternative to forming the locking well and the main body of the shell in one shot is to form a locking well separately, which is then inserted into a receiving hole cut out on the door pull protrusion. This does not change the operation of the protective shell or its characteristics as described above. The installation may differ since the protective shell is first fitted directly onto the door panel and then the locking well is inserted into the hole cutout on the shell. Removal remains the same as above.

In accordance with another aspect of the invention there is provided a vehicle door assembly, comprising: an interior door panel having an inner face with a protruding door pull defining a door well for receiving a user's fingers and a door sill leading to a window opening; and a protective shell for protecting the door panel against interior damage, the protective shell comprising: a deformable sheet of hard plastic with an exposed side and a reverse side, the reverse side being profiled to fit over the inner face of the vehicle door interior panel; an outwardly directed top surface portion for resting on the door sill; a protrusion on the exposed side of the deformable sheet for enclosing the vehicle door pull, the protrusion having an upper ledge; and a locking well extending downwardly from the upper ledge snugly fitting into the door well to hold the protective shell securely in place on the interior door panel.

In accordance with yet another aspect of the invention there is provided a method of protecting a vehicle door comprising an interior door panel having an inner face with a protruding door pull defining a door well for receiving a user's fingers and a door sill leading to a window opening, the method comprising: applying a protective shell to the inner face of the interior door panel, the protective shell being in the form of a deformable sheet of hard plastic having a protrusion enclosing the door pull, such that the protrusion rests on the door pull; and applying downward pressure to a locking well coupled to the protrusion to insert the locking well into the door well to form an interference fit retaining the protective shell in position against the interior door panel.

BRIEF DESCRIPTION OF THE DRAWINGS

The invention will now be described in more detail, by way of example only, with reference to the accompanying drawings, in which.

DETAILED DESCRIPTION OF THE DRAWINGS

Figure 2:
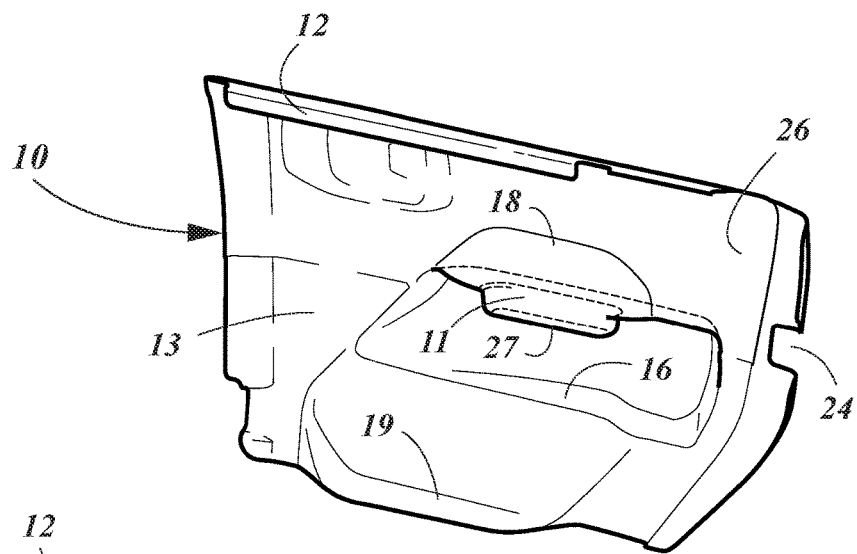
FIG. 2 is a perspective view of the protective shell of FIG. 1 showing the reverse side.
Figure 1:
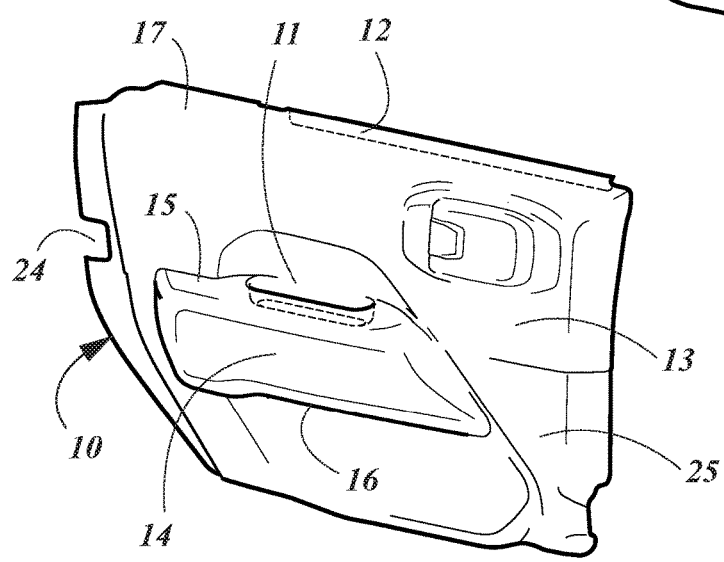
FIG. 1 is a perspective view of a protective shell for a passenger car door interior panel showing the side exposed to the interior of the vehicle.

Referring to FIG. 1 and FIG. 2, a protective shell 10 for a passenger car comprises an element shaped to fit over the original equipment door interior and interior door panel of a passenger car. The protective shell has an exposed side 25 shown in FIG. 1 that remains exposed to the interior of the vehicle while it is installed on the vehicle and a reverse side 26 shown in FIG. 2., which is mainly in contact with the original equipment door interior panel of the vehicle.

The protective shell 10 defines a mainly planar shape 13, a top surface 17, a downward flange 12 at the extremity of top surface 17, a protrusion 14 which extends toward the interior of the vehicle, and a locking well 11 located on top ledge 15 of the protrusion 14. In the example shown, the transition between the main planar shape and the top surface 17 is smoothly rounded.

Figure 3:
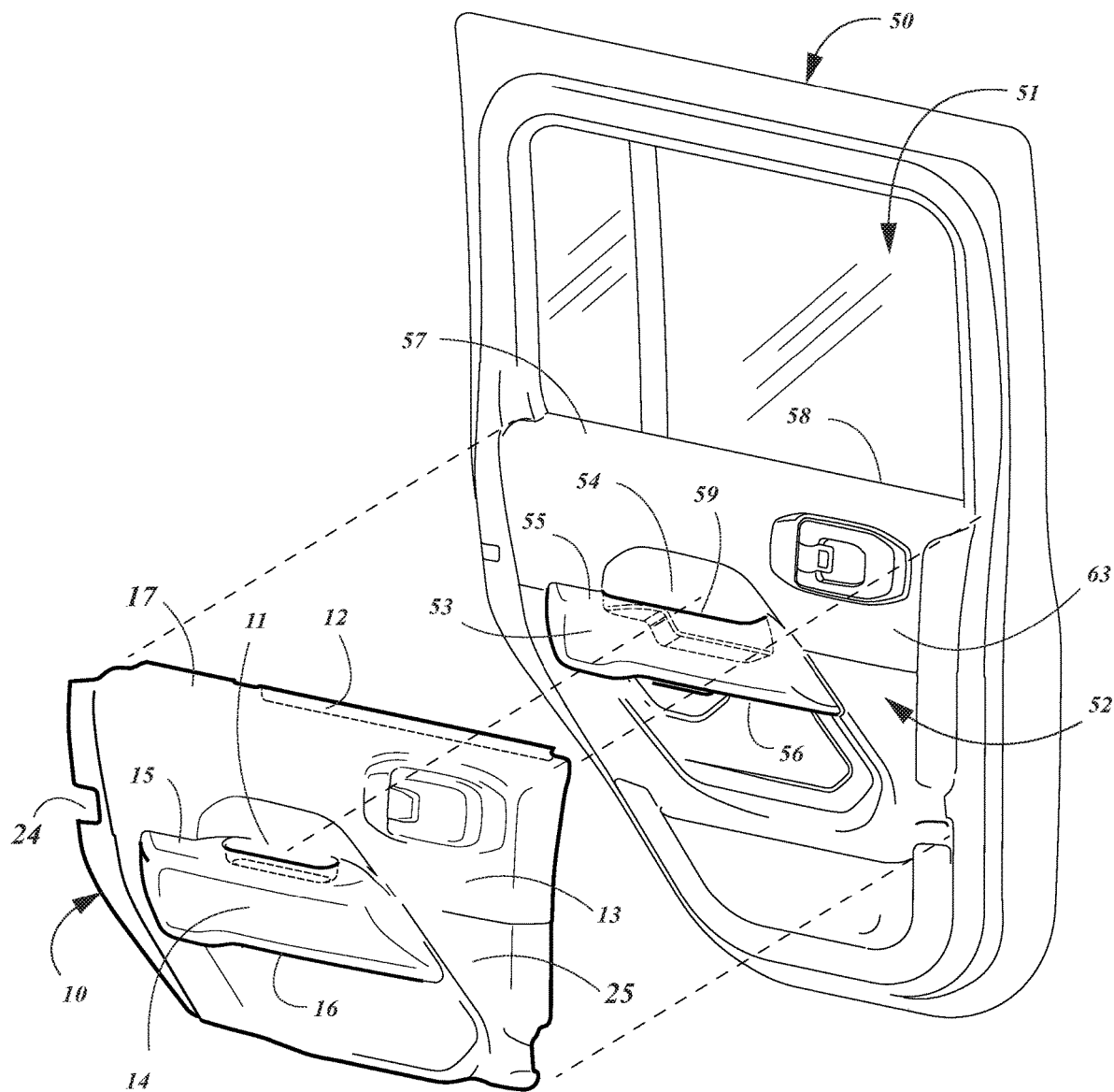
FIG. 3 is an exploded perspective view showing the protective shell of FIG. 1 aligned for mounting to the vehicle door interior panel.
Figure 4:
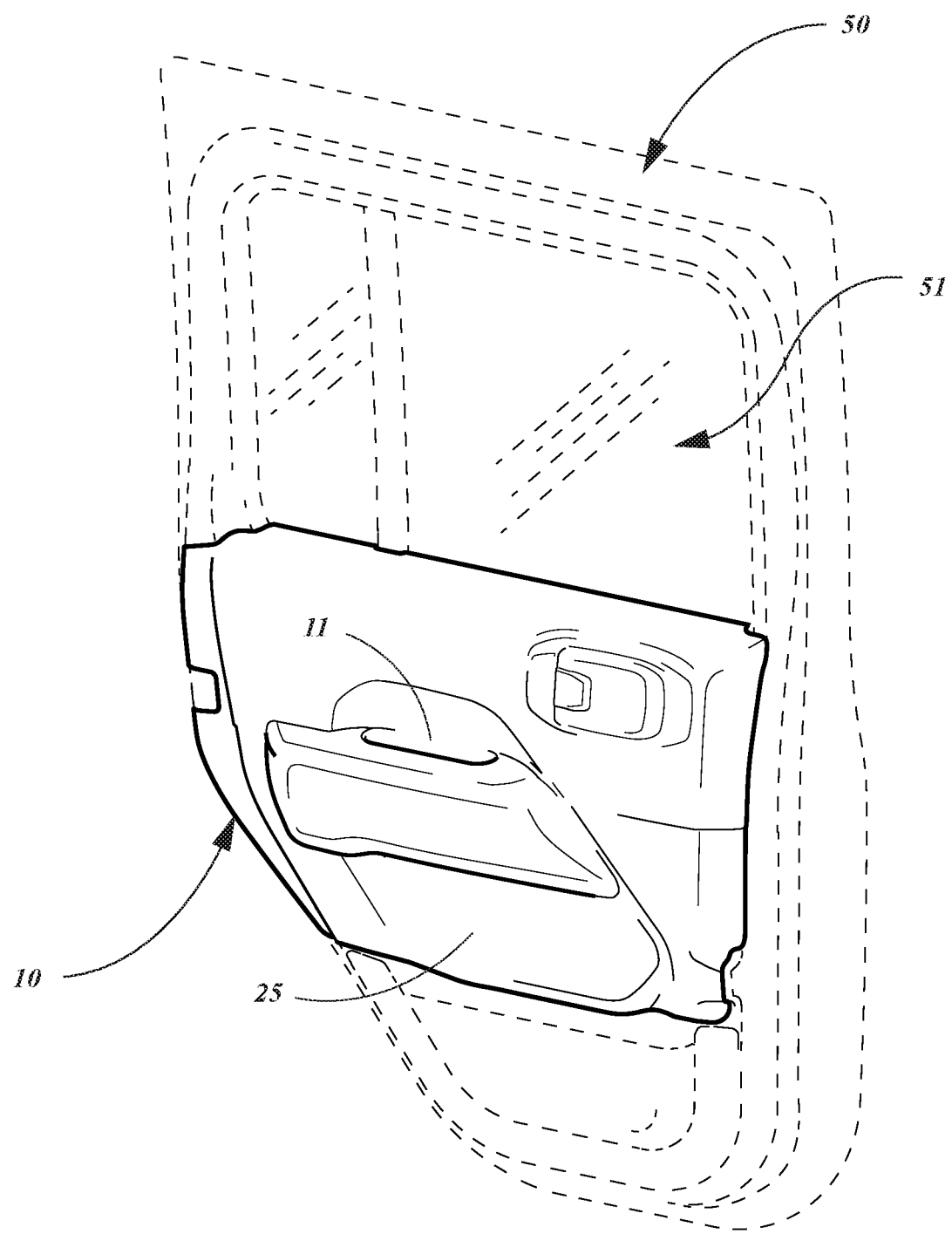
FIG. 4 is a perspective view of the protective shell of FIG. 1 installed onto the door of FIG. 3.
Figure 5:
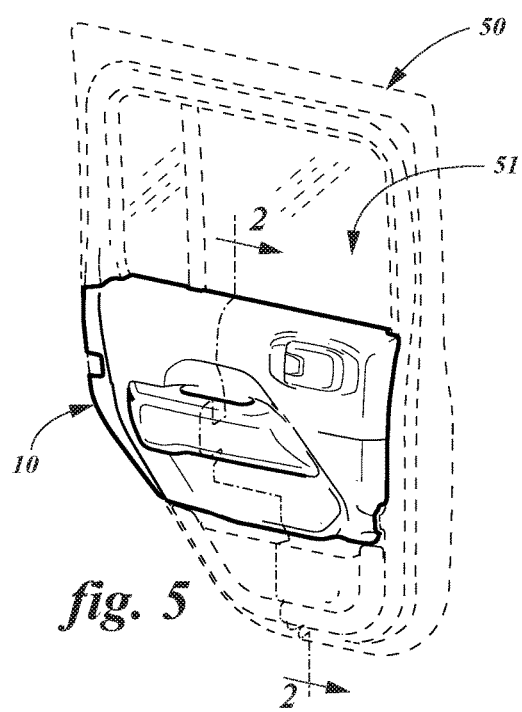
FIG. 5 is a perspective view of the protective shell of FIG. 1 installed onto the door of FIG. 3.

As shown in FIG. 3, the protective shell 10 is positioned onto the door 50 interior of the vehicle such that the flange 12 tucks over the top edge 58 of the interior door panel 52, the top surface 17 rests on top of interior door panel sill 57, the planar surface 26 lays mainly against the major face 63 of the door interior panel 52 and the protrusion 14 extends from the major plane of the protective shell 10 encloses the vehicle door pull 53. The locking well 11 is tucked into a roughly matching well 54 located on the top side of the door pull 53 of the interior door panel 52. FIG. 4 shows the protective shell 10 correctly positioned while it is installed on the vehicle door 50 interior.

As best shown in FIG. 4, the protective shell 10 is sized and shaped to cover a vehicle's original equipment interior door panel 52 and portions of the interior door 50 that are most often exposed to potential damage from its occupants or cargo, such as the vehicle's interior window sill 57, the major plane of the interior panel 63 and door pull 53, and especially the top surface of the door pull 55 which, in many modern vehicles, also serves as an armrest. The protective shell 10 is cut out at 24 to allow clearance for the striker on the vehicle corresponding pillar. Other portions of the protective shell 10 may optionally be cut out to expose or allow access to speakers, storage, door opening handle, door controls and window controls. The door example 50 in FIG. 3 is the left side rear door of a 2019 Jeep Wrangler JL.

Figure 7:
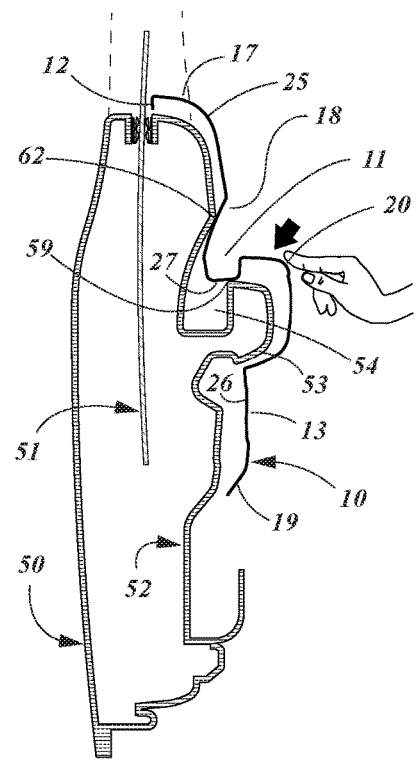
FIG. 7 is a section view of FIG. 5 in elevation taken at the line 2-2 of FIG. 5 showing the protective shell resting on the door pull of the vehicle interior door panel immediately before it is snapped into service position.
Figure 8:
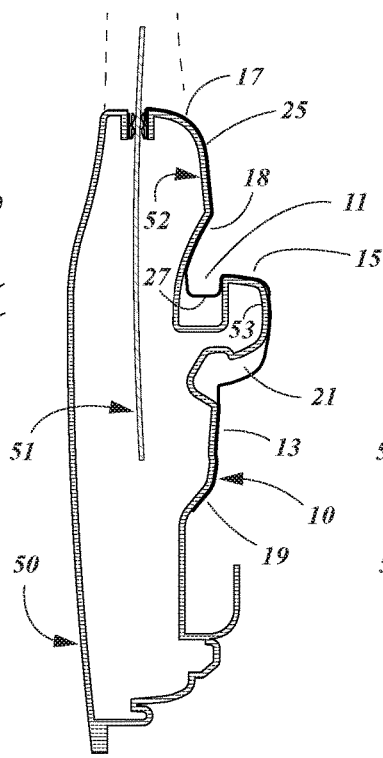
FIG. 8 is a section view of FIG. 5 in elevation taken at the line 2-2 of FIG. 5 showing the protective shell which is installed in its service position on the door panel.

As shown in FIG. 7., to install the protective shell 10 onto the vehicle door 50, it is first positioned with its reverse side 26 against the major plane of the interior door panel 63, being temporarily supported by the bottom face 27 of the locking well 11 resting on the top surface of the door pull 55. Because the bottom surface 16 of the protective shell 10 is sufficiently offset by at least the depth of the locking well 11, the protrusion 14 will fit over the door pull 53.

Figures 10, 11:
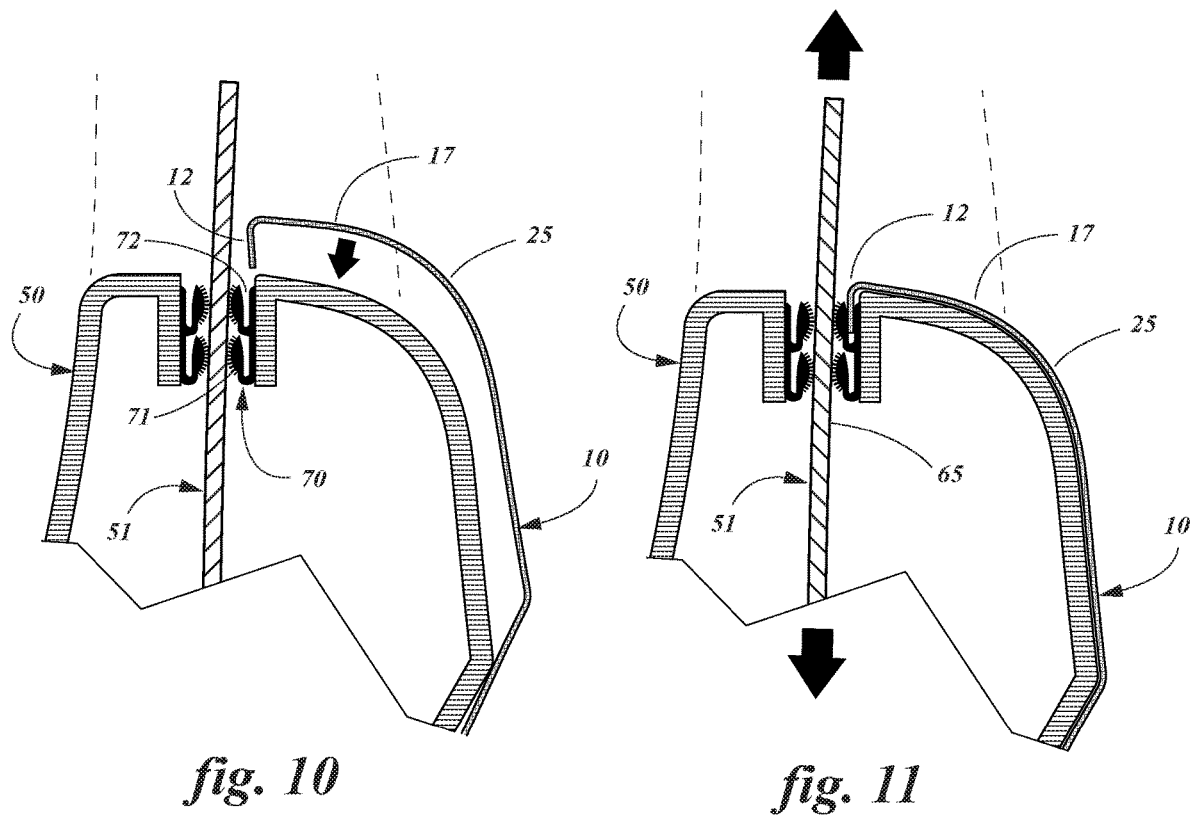
FIG. 10 is an enlarged sectional detail view of FIG. 7 showing the inner door beltline window seal of the vehicle and the protective shell.
FIG. 11 is an enlarged sectional detail view of FIG. 8 showing the inner door beltline window seal of the vehicle and the protective shell.

Using light finger pressure, it is then pushed at the center of the top edge 20 of the protrusion 14 downward and toward the interior door panel at which point, the bottom surface 27 of the well 11 will slide over the precipice 59 of the door pull well 54. Because most car door interior panels 52 are designed with various features and contours, points on the panel 52 such as 62 and 63 will inherently interfere with corresponding surfaces 18 and 19 of the protective shell and provide slight resistance. However, as the shell 10 is appropriately deformable due to the proper selection of material and gauge, it will generally buckle and allow the bottom fillet 23 of the well 11 to glide smoothly over the precipice 59 of the door pull 53 until the well 11 of the protective shell 10 snaps securely inside the well 54 of the door pull 52. Because the reverse surface 26 and flange 12 of the protective shell 10 are closely matched to the door panel 52, during the same motion, the flange 12 will automatically seat itself into the correct position inside the V channel 72 of the beltline interior window door seal 70 (FIG. 10 and FIG. 11) thus, preventing contact with the delicate fibers of the flocked side 71 of the of the seal. No part of the shell 10 will make contact with the window 51 once it is installed thus allowing the window 51 to be rolled up or down freely without causing damage to its surface 65. The walls 22 of the well 11 of the protective shell 10 which roughly match the interior walls 60 of the door pull well 54 will secure the shell in position until it is ready to be removed. The flange 12 and various interfering features such as 62 and 63 will provide additional locking support to keep the shell 10 in place.

Figure 9:
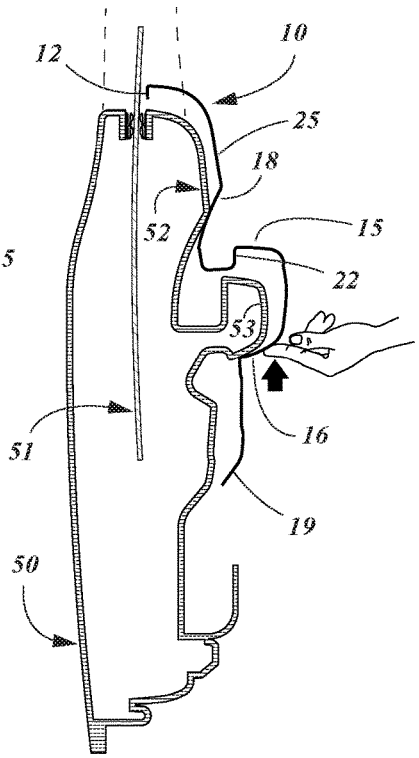
FIG. 9 is a section view of FIG. 5 in elevation taken at the line 2-2 of FIG. 5 showing the protective shell immediately after it is unsnapped from its service position on the door interior panel.

To uninstall the protective 10 shell from the door panel 52, light finger pressure is applied upward on the bottom surface 16 of the protrusion 14 as shown in FIG. 9. This action will lift the entire shell 10 thereby unseating the well 11 of out of its seated position within the well 54 of the door pull 53 and release the protective shell 10.

Figure 6:
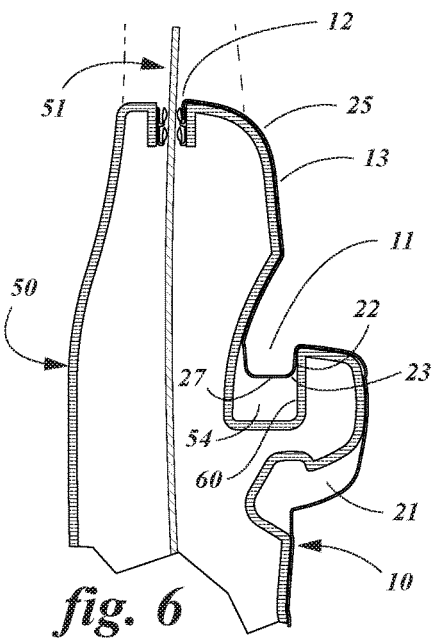
FIG. 6 is a section view of upper portion FIG. 5 in elevation taken at the line 2-2 of FIG. 5
Figures 12, 13, 14:
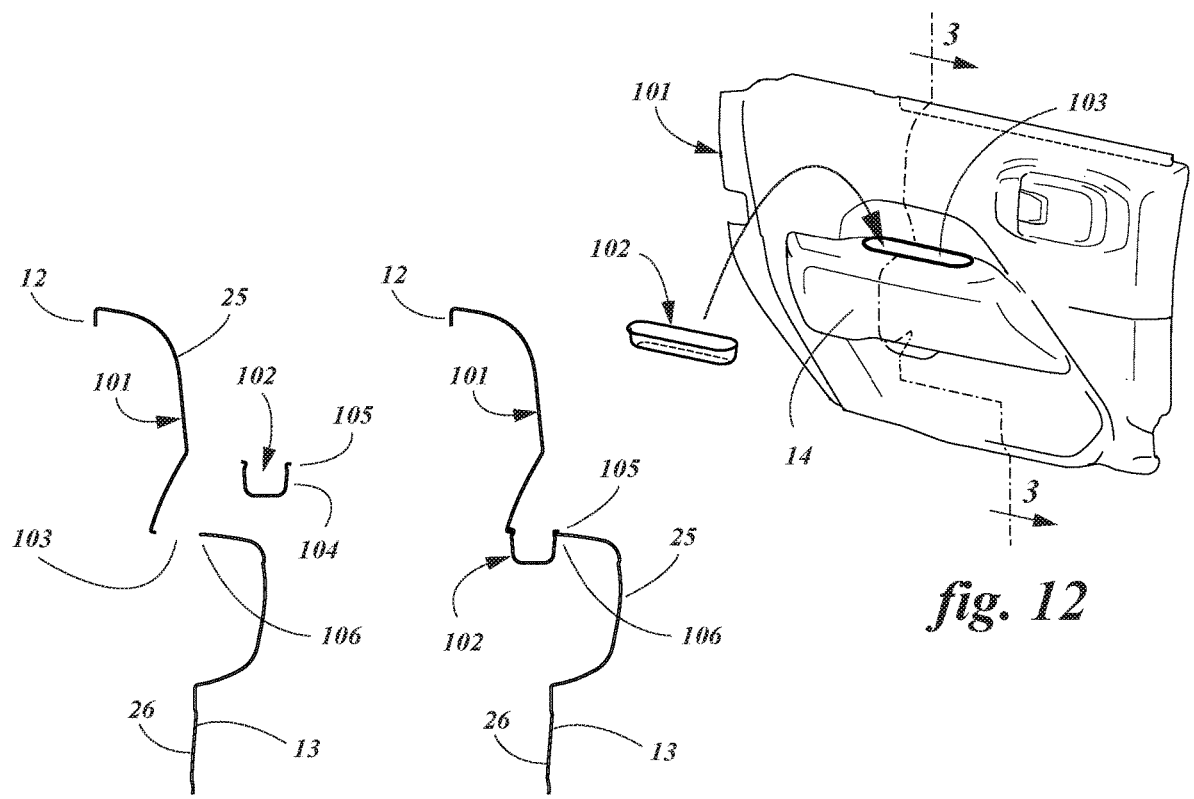
FIG. 12 is a perspective view of a variation of a protective shell of FIG. 1 showing a door pull locking well which is manufactured as a separate part from the main body of the protective shell.
FIG. 13 is an enlarged section view of the protective shell of FIG. 12 in elevation taken at the line 3-3 showing the door pull locking well which is uninstalled.
FIG. 14 is a view of the protective shell of FIG. 13 in showing the door pull locking well installed in locked position onto the main body of the protective shell.
Figures 15, 16:
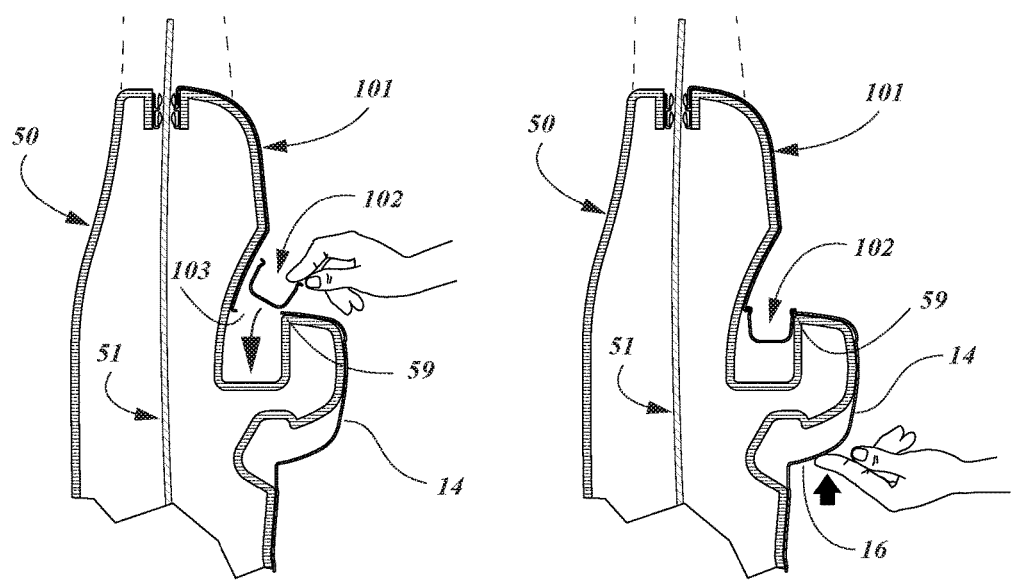
FIG. 15 is an enlarged detail view of FIG. 13 showing the door pull locking well being inserted into a receiving hole on the body of the protective shell of FIG. 12 and also showing the car door of FIG. 3.
FIG. 16 is an enlarged detail view of FIG. 14 showing the door pull locking well installed in locked position onto the main body of the protective shell.

In an alternate embodiment of the invention, the locking well 102 of the protective shell is described in FIG. 12 as a separate piece which is inserted into a receiving hole cut out 103 on the door pull protrusion 14. FIG. 13-16 are section views of 3-3 of FIG. 12. The well 102 is inserted into the hole 103 of the protective shell 101 and therein locked into position by the engagement of the cut edge 106 of the shell 101 and a small groove 105 extending around the perimeter of the well 102 just below its top edge. FIG. 15 shows an alternate method of installation where the protective shell 101 is placed over the interior panel 52 and the well 102 is inserted in the hole 103 afterward. In this case, the wall 104 of the well 102 which is locked into the shell 101 will serve the same function as the wall 22 of FIG. 6 to resist movement of the shell 101 away from the surface 63 of the interior panel 52 until it is ready to be removed. Therefore, this alternate embodiment does not change the function of the protective shell 10 or its properties as described above, even though it is manufactured as a perforated body 101 and a separate well 102.

Figure 17:
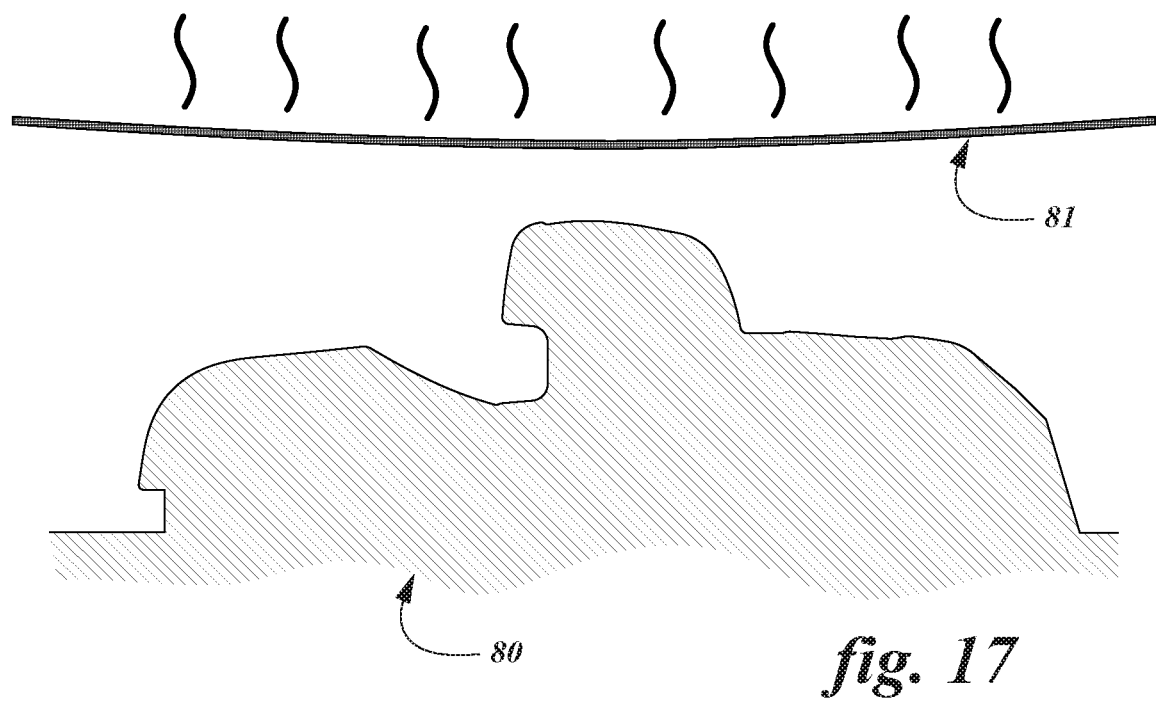
FIG. 17 is a sectional view showing a parison and mold of a vacuum forming machine.
Figure 18:
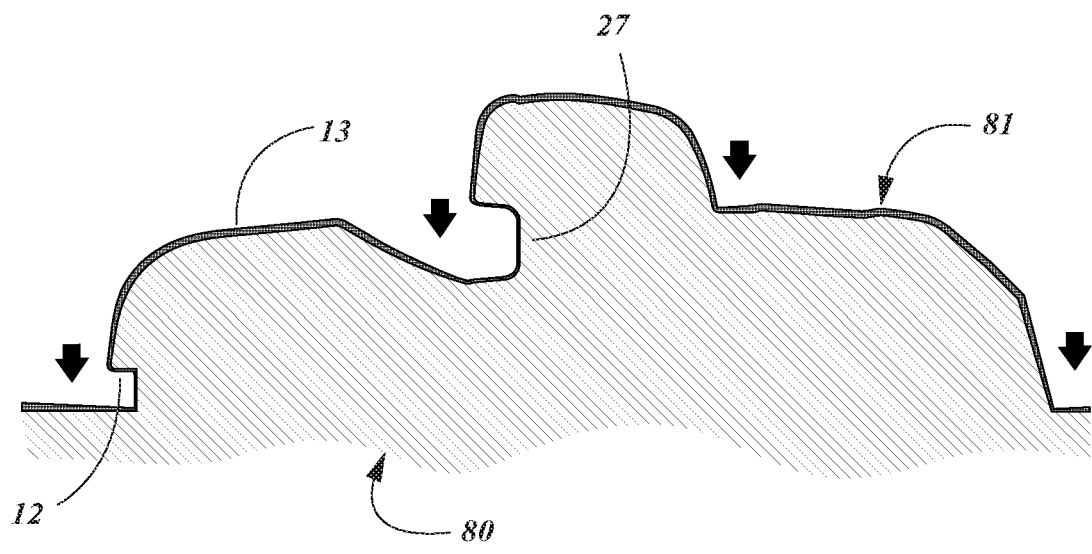
FIG. 18 is a sectional view shown the formed product on the mold.

As shown in FIGS. 17 and 18 the parison is vacuum formed over the mold 80. It will be noted that the fillet 27 at the base of the well 11 and the flange 12 are thinned as a result of the vacuum forming process. In one exemplary embodiment the thickness can vary from 0.06" in the major plane of the shell and the vertical face of the door pull protrusion to 0.03" for the fillet 27 at the bottom of the locking well 11 and the flange 12. This helps to enhance the resilience of the locking well 11 to facilitate locking in the matching well 54 of door pull and reduce the risk of the flange 12 damaging the window 51.

It will be noted that the described protective shell is removably securable to the vehicle door panel without need for fasteners or adhesives by the interface with the well of the door pull handhold and a corresponding well of the panel, is self supporting, and through the combination of its thickness and material properties is sufficiently pliable and resilient to surpass slight interferences against points on the door during installation.

What is claimed:

1. A protective shell for protecting an interior door panel of a vehicle, the interior door panel having an inner face with a protruding door pull defining a door well for receiving a user's fingers and a door sill leading to a window opening, the protective shell comprising:
    a deformable sheet of hard plastic with an exposed side and a reverse side, the reverse side being profiled to fit over the inner face of the vehicle door interior panel;
    an outwardly directed top surface portion for resting on the door sill;

a protrusion on the exposed side of the deformable sheet for enclosing the vehicle door pull, the protrusion having an upper ledge;

a locking well extending downwardly from the upper ledge and responsive to downward pressure to fit snugly into the door well to hold the protective shell securely in position on the interior door panel.

2. The protective shell of claim 1, wherein the deformable sheet is of unitary construction incorporating the locking well.

3. The protective shell of claim 2, wherein the deformable sheet is thinned in the region of the securing well to enhance the resilience thereof.

4. The protective shell of claim 1, wherein the locking well is a separate component, the upper ledge of the protrusion has a cut-out portion sized to receive the locking well, and the locking well snaps into position within the cut-out portion.

5. The protective shell of claim 4, wherein the locking well has an upper peripheral groove extending at least part way around the perimeter of the securing well to engage an internal edge of the cut-out portion.

6. The protective shell of claim 5, further comprising a downward flange on an edge of said outwardly directed top surface portion configured to hook over the door sill.

7. The protective shell of claim 6, further comprising a rounded transition region between said outwardly directed top surface portion and a major portion of said deformable sheet.

8. A vehicle door assembly, comprising:
an interior door panel having an inner face with a protruding door pull defining a door well for receiving a user's fingers and a door sill leading to a window opening; and
a protective shell for protecting the door panel against interior damage, the protective shell comprising:
a deformable sheet of hard plastic with an exposed side and a reverse side, the reverse side being profiled to fit over the inner face of the vehicle door interior panel;
an outwardly directed top surface portion for resting on the door sill;
a protrusion on the exposed side of the deformable sheet for enclosing the vehicle door pull, the protrusion having an upper ledge; and
a locking well extending downwardly from the upper ledge snugly fitting into the door well to hold the protective shell securely in place on the interior door panel.

9. The vehicle door assembly of claim 8, wherein the deformable sheet is of unitary construction incorporating the locking well.

10. The vehicle door assembly of claim 9, wherein the deformable sheet is thinned in the region of the securing well to enhance the resilience thereof.

11. The vehicle door assembly of claim 8, wherein the locking well is a separate component, the upper ledge of the protrusion has a cut-out portion sized to receive the locking well, and the locking well is snapped into the cut-out portion.

12. The vehicle door assembly of claim 11, wherein the locking well has an upper peripheral groove extending at least part way around the perimeter thereof to engage an internal edge of the cut-out portion.

13. The vehicle door assembly of claim 8, further comprising a downward flange on an edge of said outwardly directed top surface portion hooked over the door sill.

14. The vehicle door assembly of claim 8, wherein the protrusion has a bottom surface offset from a corresponding bottom surface of the door pull by an amount at least equal to the depth of the locking well.

15. A method of protecting a vehicle door comprising an interior door panel having an inner face with a protruding door pull defining a door well for receiving a user's fingers and a door sill leading to a window opening, the method comprising:
applying a protective shell to the inner face of the interior door panel, the protective shell being in the form of a deformable sheet of hard plastic having a protrusion enclosing the door pull, such that the protrusion rests on the door pull; and
applying downward pressure to a locking well coupled to the protrusion to insert the locking well into the door well to form an interference fit retaining the protective shell in position against the interior door panel.

16. The method of claim 15, wherein the deformable sheet is of unitary construction incorporating the securing well.

17. The method of claim 16, wherein the deformable sheet is thinned in the region of the locking well to enhance the resilience thereof.

18. The method of claim 15, wherein the locking well forming a separate component is inserted through a cut-out portion in an upper ledge of the protrusion into the door well so as to snap into the cut-out portion and retain the protective shell in position.

19. The protective shell of claim 18, further comprising inserting the locking well through the cut-out portion of the protrusion to snap into a peripheral groove formed at least part way around the perimeter of the well.

20. The protective shell of claim 15, further comprising hooking a downward flange on an edge of an outwardly directed top surface portion of said deformable sheet over the door sill.

* * * * *